United States Patent
Sakata et al.

(10) Patent No.: US 7,525,791 B2
(45) Date of Patent: Apr. 28, 2009

(54) SOLID ELECTROLYTIC CAPACITOR

(75) Inventors: Koji Sakata, Miyagi (JP); Takeshi Saito, Miyagi (JP); Yuji Yoshida, Miyagi (JP); Takeo Kasuga, Miyagi (JP); Masanori Takahashi, Miyagi (JP); Katsuhiro Yoshida, Miyagi (JP)

(73) Assignee: NEC Tokin Corporation, Miyagi (JP)

( * ) Notice: Subject to any disclaimer, the term of this patent is extended or adjusted under 35 U.S.C. 154(b) by 0 days.

(21) Appl. No.: 12/042,618

(22) Filed: Mar. 5, 2008

(65) Prior Publication Data
US 2008/0218943 A1  Sep. 11, 2008

(30) Foreign Application Priority Data
Mar. 6, 2007  (JP) ............................ 2007-055299

(51) Int. Cl.
*H01G 9/04* (2006.01)
(52) U.S. Cl. .................. 361/528; 361/523; 361/525; 361/529; 361/516; 361/519
(58) Field of Classification Search .............. 361/523, 361/525, 528, 529, 516–519, 532–540, 508–509; 29/25.01, 25.03
See application file for complete search history.

(56) References Cited

U.S. PATENT DOCUMENTS

| | | | | |
|---|---|---|---|---|
| 6,462,936 B1* | 10/2002 | Fujimoto et al. | ............ | 361/525 |
| 6,552,896 B1* | 4/2003 | Igaki et al. | ................. | 361/523 |
| 6,813,140 B1* | 11/2004 | Huntington | ................. | 361/528 |
| 6,870,728 B1* | 3/2005 | Burket et al. | ................ | 361/538 |
| 6,980,416 B2* | 12/2005 | Sakaguchi et al. | ......... | 361/523 |
| 7,457,103 B2* | 11/2008 | Yoshida et al. | ............. | 361/523 |

FOREIGN PATENT DOCUMENTS

JP  2002-289469  4/2002
JP  2002-343686  11/2002

* cited by examiner

*Primary Examiner*—Nguyen T Ha
(74) *Attorney, Agent, or Firm*—Whitham Curtis Christofferson & Cook, PC

(57) ABSTRACT

A solid electrolytic capacitor is provided which is capable of exhibiting an excellent characteristic and high reliability against thermal stress. The solid electrolytic capacitor includes a base member having a capacitor element connecting face on its upper surface side and an electrode mounting face on its lower surface side and being made up of an insulating plate having first conductors and second conductors, disposed in a staggered format, each providing conduction between the upper and lower surface sides of the base member, and the capacitor element having anode portions and cathode portions, each being disposed in a staggered format, connected to each of the first and second conductors.

6 Claims, 2 Drawing Sheets

SOLID ELECTROLYTIC CAPACITOR

INCORPORATION BY REFERENCE

This application is based upon and claims the benefit of priority from Japanese Patent Application No. 2007-055299, filed on Mar. 6, 2007, the disclosure of which is incorporated herein in its entirety by reference.

BACKGROUND OF THE INVENTION

1. Field of the Invention

The present invention relates to a decoupling capacitor used in power supply circuits for electronic devices and more particularly to a solid electrolytic capacitor having a plurality of mounting terminals in particular.

2. Description of the Related Art

In recent years, electronic devices have been made small-sized, thin, and highly functional in a progressive manner and one of efficient means to achieve the progression is to make a circuit driving frequency high. To realize this, a reduction of equivalent series inductance (hereafter simply "ESL") is becoming a recent rend.

An increase in ESL is attributable to factors including permeability of a conductor in a device, wire length from an inside portion of the device to a mounting terminal, shape of the wire, or a like. To solve these problems, various methods have been available recently including a method in which anode and cathode mounting terminals are made to come near to each other to decrease an inductance component called loop inductance occurring between the anode and cathode terminals and a method in which the number of the mounting terminals is decreased and the anode and cathode terminals are disposed alternately and one-dimensionally or two-dimensionally in a staggered format or in a zigzag form.

For example, a capacitor structure is disclosed in Patent Reference 1 (Japanese Patent Application Laid-open No. 2002-343686) in which ESL is made small by alternately disposing an anode mounting terminal and cathode mounting terminal and, in order to realize the alternate disposition, after forming an insulating resin portion on a parent metal in an element portion and on a porous substance portion obtained after the formation of a solid electrolyte, by forming through holes in the insulating resin portion and by filling inside portions of the through holes with conductors, cathode conductors in the element portion is connected to the cathode mounting terminals and an anode mounting terminal is formed directly on the parent metal in the element portion. Moreover, the surfaces on which the anode mounting terminal and cathode mounting terminal are disposed are coated with an insulating protecting layer (sheathing resin).

Also, another capacitor structure is disclosed in Patent Reference 2 (Japanese Patent Application Laid-open No. 2002-289469) in which zigzag-shaped disposition of terminals is realized without forming through holes in a parent metal. Here, an electrode portion made non-porous is formed on one side of a sheet of valve-action metal making up a parent metal and a connecting terminal to be connected to the electrode portion is used as a positive mounting terminal. After portions of the valve-metal sheet other than the electrode portion are made porous, a dielectric film is formed in the portion and further a solid electrolyte layer and current collector layer are formed on the dielectric film and a connecting terminal to be connected to the current collector layer is used as a negative mounting terminal. The anode mounting terminal and cathode mounting terminal are insulated by an insulator being interposed between the anode and cathode mounting terminals.

However, conventional capacitor structures have problems. That is, in the conventional solid electrolytic capacitor disclosed in the Patent Reference 1, after forming a required number of through holes in the porous substance portion, by filling the through holes with the insulating resin and curing the filled resin, and then by forming the second through holes with a diameter not exceeding the diameter of through holes formed in an initial stage at center portions of the cured resist portions and further by coating and filling the inside portions of the through holes by plating, the conductors are obtained. However, there is a problem that a leakage current characteristic of the solid electrolytic capacitor is degraded due to cracking occurring in the resin portions by mechanical and thermal stresses or due to damage caused in the porous portion in portions surrounding the through holes while the second through holes are being formed.

Moreover, in the conventional solid electrode capacitor disclosed in the Patent Reference 2, since no through holes are formed in the porous substance portion, the above problems occurred in the solid electrolytic capacitor disclosed in the Patent Reference 1 can be solved, however, since the anode and cathode mounting terminals are formed directly on the parent metal and on the porous substance portion of the parent metal, there is a problem that, when the solid electrolytic capacitor is mounted on the substrate or in the temperature cycle, the characteristics of the solid electrolytic capacitor, equivalent series resistance in particular is degraded by thermal stress occurring due to a difference in thermal expansion coefficients between the substrate and the solid electrolytic capacitor.

SUMMARY OF THE INVENTION

In view of the above, it is an object of the present invention to provide a solid electrolytic capacitor which is capable of exhibiting an excellent characteristic and high reliability against thermal stress.

According to a first aspect of the present invention, there is provided a solid electrolytic capacitor including:

a base member having a capacitor element connecting face on its upper surface side and an electrode mounting face on its lower surface side and an insulating plate including at least one first conductor and at least one second conductor each providing conduction between the upper and lower surfaces of the base member; and a capacitor element having at least one anode portion and at least one cathode portion, on the upper surface of the base member being connected to each of the first and second conductors, wherein the capacitor element includes an anode body made of a parent material which is plate-like or foil-like valve-action metal, a part of which is connected, as the anode portion, to the first conductor of the base member via an anode electrode having an insulator in a portion surrounding the anode electrode, an dielectric made of an oxide film of the parent metal formed on a surface of the parent metal excluding the anode portion, and a cathode body made up of a conductive polymer layer overlying the dielectric and a cathode conductor layer overlying the conductive polymer layer, and wherein a part of the cathode conductor layer as the cathode portion is connected to the second conductor of the base member.

According to a second aspect of the present invention, there is provided a solid electrolytic capacitor including:

a base member having a capacitor element connecting face on its upper surface side and an electrode mounting face on its lower surface side and an insulating plate including a plurality of first conductors and a plurality of second conductors each providing conduction between the upper and lower surfaces of the base member each being disposed in a staggered format; and a capacitor element having a plurality of anode portions and a plurality of cathode portions each being disposed, in a staggered format, on the upper surface of the base member being connected to each of the first and second conductors, wherein the capacitor element includes an anode body made of a parent material which is plate-like or foil-like valve-action metal, a plurality of part of which is connected, as each of the anode portions, to each of the first conductors of the base member via each anode electrode having an insulator in a portion surrounding the anode electrode, dielectrics made of oxide films formed on surfaces of the parent metal excluding each of the anode portions, and a cathode body made up of a conductive polymer layer overlaid on each of the dielectrics and a cathode conductor layer formed on the conductive polymer layer, and wherein a plurality of parts of the cathode conductor layer as each of the cathode portion is connected to each of the second conductor of the base member.

In the foregoing, a preferable mode is one wherein, on at least one of the upper surface and lower surface of the base member are formed first metal plates or first metal foils and second metal plates or second metal foils each being connected to each of the first conductors and second conductors wherein each of the metal plates or metal foils is connected to each of the anode portions and cathode portions.

Also, a preferable mode is one wherein a thermal expansion coefficient of a composite material making up the electrolytic capacitor in a surface portion on the electrode mounting face side of the base member is in a range between 16 ppm/° C. and 26 ppm/° C.

With the above configuration, the capacitor element is mounted through a base member on a substrate and, therefore, thermal stress is relaxed in a temperature cycle when or after the capacitor element is mounted on the substrate and degradation of characteristics of the solid electrolytic capacitor, in equivalent series resistance in particular can be suppressed, thus providing the solid electrolytic capacitor capable of exhibiting an excellent characteristic and high reliability against thermal stress.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EXEMPLARY EMBODIMENTS

Best modes of carrying out the present invention will be described in further detail using various exemplary embodiments with reference to the accompanying drawings.

First Exemplary Embodiment

Figure 1:
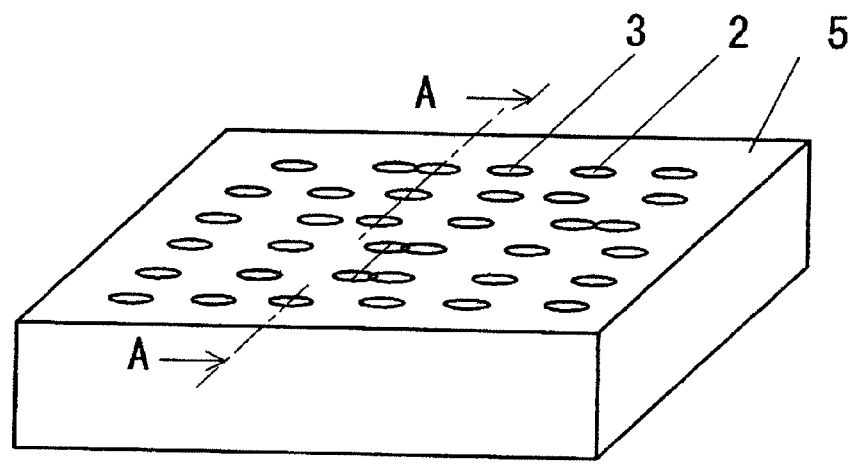
FIG. 1 is a perspective view of a solid electrolytic capacitor according to a first exemplary embodiment of the present invention.
Figure 2:
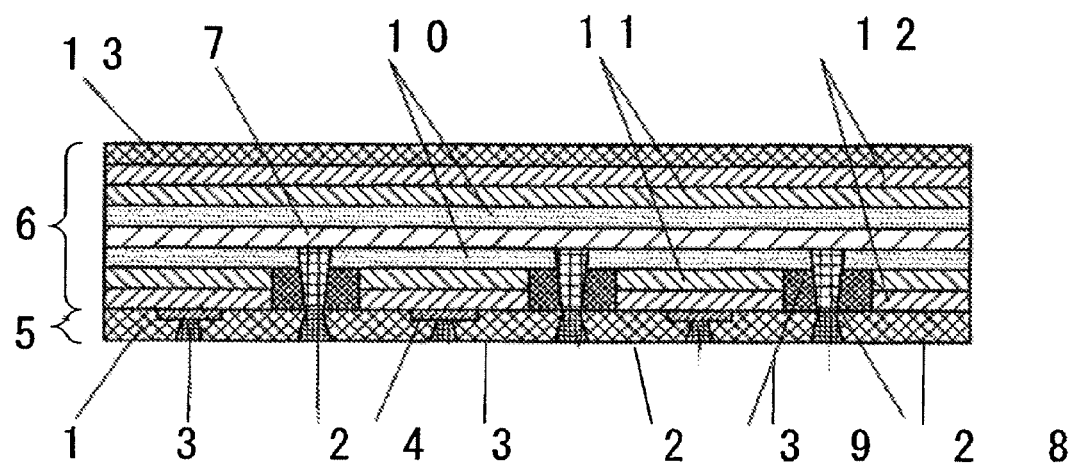
FIG. 2 is a schematic cross-sectional view of the solid electrolytic capacitor of FIG. 1 taken along a line A-A.

FIG. 1 is a perspective view of a solid electrolytic capacitor of the first exemplary embodiment of the present invention. FIG. 2 is a schematic cross-sectional view of the solid electrolytic capacitor of FIG. 1 taken along a line A-A. In FIG. 1, for convenience sale, the solid electrolytic capacitor is turned upside down so that an electrode mounting face is shown upward.

The solid electrolytic capacitor of the first exemplary embodiment, as shown in FIGS. 1 and 2, includes a base member 5 having a capacitor element connecting face on its upper surface side and an electrode mounting face on its lower surface side and a capacitor element 6 connected to the base member 5. The base member 5 includes an insulating plate 1 in which through holes are formed in a grid form, first conductors (anode vias) 2 and second conductors (cathode vias) 3 formed in each of the through holes and each piercing from a surface side to a rear side of the insulating plate 1 both being disposed also in a staggered format, otherwise in a zigzag form, and cathode electrode plates 4 made of a metal plate or metal foil such as copper each formed on each of the second conductors (cathode vias) 3. The capacitor element 6 has anode portions and cathode portions each to be connected to each of the first conductors (anode vias) 2 and the second conductors (cathode vias) 3.

The above capacitor element 6 uses, as its anode 7, a parent material made of a plate-like or foil-like valve-action metal such as tantalum, niobium, aluminum, or an alloy thereof and forms and separates a required number of anode electrodes 8 each made of gold, aluminum, or a like, from part of the anode 7, that is, from each of the anode portions. Each of the anode electrodes 8 is electrically connected to each of the first conductors (anode vias) 2. In portions surrounding each of the anode electrodes 8 are formed insulators 9 made of an insulating resin or a like such as an epoxy resin by using, for example, a coating method or a like such as a screen printing method. On the surface of the anode 7 excluding portions with which each of the anode electrodes 8 is in contact are formed dielectrics 10 and on the dielectrics 10 excluding portions in which each of the anode electrodes 8 and the insulators 9 are formed are formed conductive polymer layers 11 and cathode conductors 12 made of graphite, silver, or a like. Moreover, the dielectric layers 10, conductive polymer layers 11, and cathode conductors 12 are formed on the surface of the anode 7, that is, on the upper and lower surfaces and on the anode 7 side. Part of each of the cathode conductors 12, that is, the cathode portion described above is connected to each of the second conductors (cathode vias) 3 through each of the cathode electrode plates 4. The formation of the cathode electrode plates 4 is not indispensable, however, by forming the cathode electrode plates 4, an area can be expanded on the second conductors (cathode vias) 3 and, therefore, stability in connection can be obtained.

The insulating plate 1 making up the base member 5 is an insulating member selected out of glass fiber-impregnated epoxy (hereinafter, referred to as "glaepo)", liquid crystal polymer, or a like, and the anode vias 2 and cathode vias 3 passing through the insulating plate 1 in a grid form are formed by a plating method using copper or a like or by a conductive paste bonding method. Moreover, the upper surface of the capacitor element 6 is coated with a sheathing material 13.

The thermal expansion coefficient in a surface portion of the substrate to be employed is preferably 17 ppm/° C. to 25 ppm/° C. The reason is that the inventor has found that, when the substrate having the thermal expansion coefficient within the range between 17 ppm/° C. and 25 ppm/° C. is designed and used as part of components of the solid electrolytic capacitor, the occurrence of failures at a time of mounting decreases.

Second Exemplary Embodiment

Figure 3:
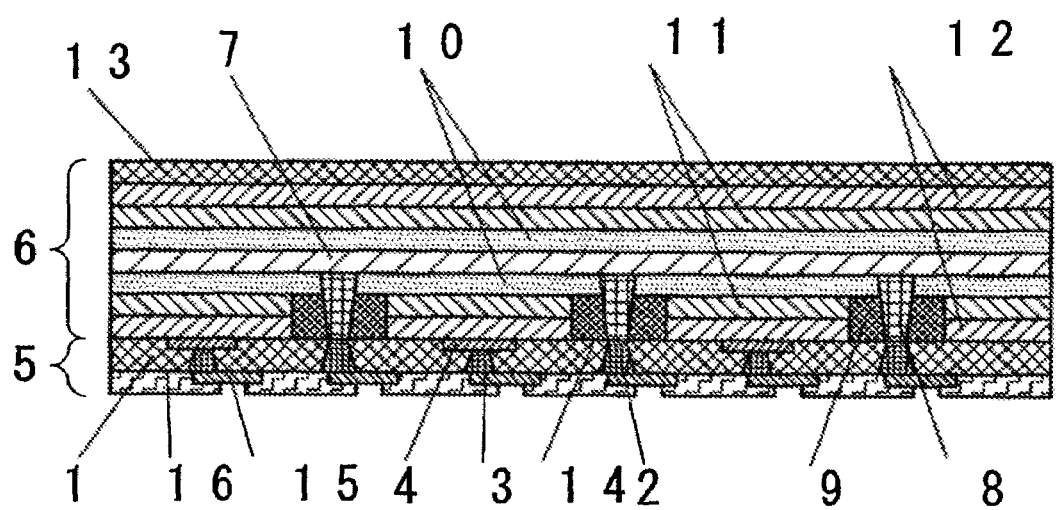
FIG. 3 is a schematic cross-sectional view of a solid electrolytic capacitor according to a second exemplary embodiment of the present invention.

FIG. 3 is a schematic cross-sectional view of a solid electrolytic capacitor of the second exemplary embodiment of the present invention.

A base member employed in the solid electrolytic capacitor of the second exemplary embodiment is different from that used in the first exemplary embodiment. As shown in FIG. 3, the base member 5 of the solid electrolytic capacitor of the second exemplary embodiment having a capacitor element connecting face on its upper surface side and an electrode mounting face on its lower surface side includes an insulating plate 1 in which through holes are formed in a grid form, first conductors (anode vias) 2 and second conductors (cathode vias) 3 formed in each of the through holes and each piercing from a surface side to a rear side of the insulating plate 1 both being disposed in a staggered format, and an anode electrode plate 14 and each of cathode electrode plates 4 made of a metal plate such as copper or of a metal foil disposed on each of the anode vias 2 and cathode vias 3, both being formed on the same surface, that is, on the capacitor element connecting face of the base member 5 and, on a main surface facing the anode electrode plate 14 and each of the cathode electrode plates 4, a plurality of mounting terminal plates 15 made of a metal plate such as copper or a metal foil is formed on the same surface, that is, on the electrode mounting surface. Each of the terminal mounting plates 15 excluding a circularly exposed portion of a required size (this portion is connected in the mounting) is coated with an insulating layer 16. The insulating layer 16 is a resist layer with a thickness of about 10 μm which can be formed by using a printing method or a method using a tape material.

Hereinafter, some examples of manufacturing processes of the solid electrolytic capacitor are particularly described.

EXAMPLE 1

The example of manufacturing processes of the solid electrolytic capacitor of the first exemplary embodiment of the present invention is described by referring to FIG. 2.

(First Process: Formation of Insulator for Anode Electrode)

First, the manufacturing of the capacitor element is explained. A foil being commercially available as a material for an aluminum electrolytic capacitor was selected which provided a capacitance of 200 μF per unit square centimeter and in which 9V was used as a formation voltage for forming a dielectric. The foil was cut to have a size of 4 mm square and, on each of dielectrics 10 of an anode 7 on the surface of the substrate side on one side of the cut foil, grid points with 0.6 mm pitches were coated using a printing method, in a staggered format, with a circular epoxy resin with a diameter of 0.6 mm, resulting in the formation of each of the dielectrics 10 with 1.2 mm pitches.

(Second Process: Formation of Anode Electrode)

Thereafter, a central portion of an insulator 9 was removed by using a laser beam to expose a core of the aluminum foil with a diameter of 0.3 mm where a gold bump was formed to separate each of anode electrodes 8. This portion is called an anode portion.

(Third Process: Formation of Conductive Polymer Layer and Cathode Conductor)

Then, on the dielectrics 10 surrounding each of the anode electrodes 8 and on the insulators 9 on the substrate side and on the dielectric 10 on the opposite side was formed a conductive polymer layer 11 and, further, a cathode conductor 12 was formed by sequentially overlaying graphite and silver paste thereon.

(Fourth Process: Preparation of Base Material)

Next, relative to a position of each of the insulators 9 formed, in a staggered format, at each of the grid points with 0.6 pitches, a copper foil (not shown) with a thickness of 18 μm hollowed out so as to have a diameter of 0.6 mm is connected, by using silver paste, to the capacitor element having been already completed up to the third process.

(Fifth Process: Connection to Base Material)

Then, the base member with a thickness of 60 μm made of an epoxy resin containing a glass unwoven fabric (glaepo) was bonded to the upper and lower surfaces of the capacitor element 6 in a manner in which a capacitor element 6 was wrapped in and the base member bonded to the upper surface of the capacitor element 6 was used as a sheathing member 13 and the base member bonded to the lower surface of the capacitor element 6 was used as the insulating plate 1. Next, by forming, using a laser beam, the through holes each with a diameter of 0.15 mm, at each of the grid points with the 0.6 mm pitches on the insulating plate 1 and further by forming, by using a copper plating method, the conductors, that is, the anode vias 2 and cathode vias 3 in each of the through holes, each of the anode electrodes 8 formed in the second process was coupled to each of the anode vias 2 and each of the cathode conductors 12 formed in the third process was connected to each of the cathode vias 3. Here, by filling all the inside portions of each of the anode vias 2 and cathode vias 3 with the conductors, the surface of each of the vias 2 and 3 was made to function as the mounting terminal.

The average electrical characteristics of 10 pieces of the solid electrolytic capacitors manufactured as above show that its capacitance is 20 μF at the frequency of 120 Hz and its equivalent series resistance is 10 mΩ at the frequency of 100 kHz.

EXAMPLE 2

The example of manufacturing processes of the solid electrolytic capacitor of the second exemplary embodiment of the present invention is particularly described by referring to FIG. 3.

In the case of the solid electrolytic capacitor of the example 2, the capacitor element 6 was manufactured by the same methods as employed in the first to fourth processes in the example 1 described above. Therefore, the fifth process and onward is described here.

(Fifth Process: Manufacturing of Base Member)

Then, by bonding, in advance, the copper foil with a diameter of 18 μm to both sides of the base member 5 with a thickness of 60 μm made of an epoxy resin containing a glass unwoven fabric (glaepo) and, then, by forming, using a laser beam, a hole (with a diameter of 0.09 mm) piercing through the base member 5 with the thickness of 60 µm at the grid points with 0.06 mm pitches and, further, by electrically connecting, using copper plating, the copper foil bonded to both the sides of the base member 5 to the inside portion of the hole, the anode vias 2 and cathode vias 3 were formed. Next, the copper foil bonded to both the sides of the base member 5 was worked by using an etching method so as to have a specific shape. That is, by removing, using an etching method, the copper foil excluding the portion of the copper foil facing each of the anode and cathode portions disposed, in a staggered format, on the capacitor element 6, that is, excluding the portion of the copper foil facing each of the anode electrode plates 14 and cathode electrode plates 4, the surface of the remaining copper foil was separated by insulation. Similarly, by removing, using an etching method, the copper foil excluding the portion of a specific size directly under each of the anode vias 2 and cathode vias 3, the remaining copper foil, that is, the terminal mounting plate 15 was separated by insulation. The portion of the copper foil to be left in the etching process corresponding to each of the anode electrode plates 14 is 0.3 mm in diameter and the portion corresponding to each of the cathode electrode plates 4 is 0.6 mm in diameter and the portion corresponding to the mounting terminal plate 15 is 0.5 mm in diameter. Further, by exposing the obtained base member having a specific size (here, 0.03 mm in diameter) on the terminal mounting plate 15 and by coating the remaining portion with the insulating layer 16 made of the epoxy resin so as to have a thickness of 10 µm to form the mounting terminal with a specific size, the base member 5 was completed.

(Sixth Process: Connection of Base Material to Capacitor Element)

Next, the base member 5 prepared in the fourth process is connected to the capacitor element 6. The connection was achieved by bonding each of the cathode conductors 12 on the capacitor element 6 to each of the cathode electrode plates 4 on the base member 5 by using conductive paste (not shown) such as silver paste and by overlaying each of the anode electrodes 8 made up of gold bumps routed from the anode 7 on the capacitor element 6 formed in the second process on each of the anode electrode plates 14 on the base member 5 and by heating both of them under pressure to obtain the anode portions.

(Seventh Process: Sheathing)

Finally, by bonding the sheathing member 13 on combined compositions of the base member 5 and capacitor element 6, the solid electrolytic capacitor was completed.

The average electrical characteristics of 10 pieces of the solid electrolytic capacitors manufactured as above showed that its capacitance was 20 µF at the frequency of 120 Hz and its equivalent series resistance was 11 mΩ at the frequency of 100 kHz. Moreover, the thermal expansion coefficient in a portion on the electrode mounting face side of the base member 5 was 20 ppm/° C.

EXAMPLE 3

The example 3 of manufacturing processes of the solid electrolytic capacitor of the second exemplary embodiment is described, in which the thermal expansion coefficient in a portion on the electrode mounting face side of the base member 5 is 16 ppm/° C. being different from that in the example 2. The manufacturing processes of the solid electrolytic capacitor in the example 3 are approximately the same as those employed in the example 2 and, therefore, the different points only are explained by referring to the manufacturing processes of the example 2. The example 3 differs from the example 2 in that, in the fourth process (process of preparation of base member) of the example 3, a content of the glass unwoven fabric contained in the base member with a thickness of 60 µm was increased by 10% than that applied in the example 2 and the thickness of the copper foil to be bonded on both the sides of the base member was changed to be 25 µm. Other conditions for manufacturing were the same as in the example 2.

The average electrical characteristics of 10 pieces of the solid electrolytic capacitors manufactured as above showed that its capacitance was 20 µF at the frequency of 120 Hz and its equivalent series resistance was 10.5 mΩ at the frequency of 100 kHz.

EXAMPLE 4

The example 4 of manufacturing processes of the solid electrolytic capacitor, the thermal expansion coefficient of a portion on the mounting electrode side of the base member 5 of which is 26 ppm/° C. that is different from that in the example 2, is described below. The manufacturing processes of the solid electrolytic capacitor in the example 4 are approximately the same as those employed in the example 2 and, therefore, the different points only are explained by referring to the manufacturing processes of the example 2. The example 4 differs from the example 2 in that, in the fifth process (manufacturing of base member) of the example 4, the thickness of 60 µm of the base member 5 was changed to be 100 µm and a rate of the glass unwoven fabric contained in the base member 5 was made smaller by 20% than that applied in the example 2. Other conditions for manufacturing were set to be the same as in the example 2.

The average electrical characteristics of the 10 pieces of the solid electrolytic capacitors manufactured as above showed that its capacitance was 20 µF at the frequency of 120 Hz and its equivalent series resistance is 12 mΩ at the frequency of 100 kHz.

COMPARATIVE EXAMPLE

As the comparative example, 10 pieces of solid electrolytic capacitors were fabricated by using a known technology disclosed in Patent Reference 2. That is, the first to fourth processes employed in the above example 1 were performed to fabricate a capacitor element and, then, the capacitor element excluding portions of part of each of the anode electrodes and cathode conductor was coated with an epoxy resin. The average electrical characteristics of the 10 pieces of the solid electrolytic capacitors manufactured here showed that their capacitance was 20 µF at the frequency of 120 Hz and its equivalent series resistance was 11 mΩ at the frequency of 100 kHz. The conditions for manufacturing the solid electrolytic capacitor including formation voltages to be used for forming an aluminum foil and/or dielectric, area of an anode separating and forming section, sizes of surrounding insulators, capacity of the solid electrolytic capacitor, and designing factor that might affect the equivalent series resistance were set to be the same as employed in the example 2.

After mounting the solid electrolytic capacitor on a substrate, a reflow process was performed by letting the solid electrolytic capacitor pass through a reflow furnace at 245% for 10 seconds by using lead-free plating, further reflow process at at 245° C. was repeated and temperature cycle tests (−55° C. to +55° C., hold time 30 min., 500 cycles) were performed. The table 1 shows an average capacitance and equivalent series resistance (ESR) of the 10 pieces of the solid electrolytic capacitor of each of the examples and the comparative example before and after the series of the tests.

TABLE 1

|  | Capacitance (120 Hz) Unit: µF | | ESR (100 kHz) Unit: mΩ | |
| --- | --- | --- | --- | --- |
|  | Before tests | After tests | Before tests | After tests |
| Example 1 | 20 | 20 | 10 | 30 |
| Example 2 | 20 | 20 | 11 | 20 |
| Example 3 | 20 | 20 | 10.5 | 80 |
| Example 4 | 20 | 20 | 12 | 105 |
| Comparative example | 20 | 18 | 11 | 20000 |

As shown from Table 1, the solid electrolytic capacitors of the examples 1 to 4 showed excellent characteristics in the series of reliability tests when compared with the comparative example. It is shown that, when comparison is made among the examples 1 to 4 in which the thermal expansion coefficients are changed, the solid electrolytic capacitor of the example 2 whose thermal expansion coefficient is larger than 16 ppm/° C. (value in the example 3) and in a range of less than 26 ppm/° C. (value in the example 4) in particular provides excellent reliability.

It is apparent that the present invention is not limited to the above exemplary embodiments but may be changed and modified without departing from the scope and spirit of the invention.

What is claimed is:

1. A solid electrolytic capacitor comprising:

a base member having a capacitor element connecting face on its upper surface side and an electrode mounting face on its lower surface side and an insulating place comprising at least one first conductor and at least one second conductor each providing conduction between the upper and lower surfaces of said base member; and a capacitor element having at least one anode portion and at least on cathode portion, on the upper surface of said base member being connected to each of said first and second conductors, wherein said capacitor element comprises an anode body made of a parent material which is plate-like or foil-like valve-action metal, a part of which is connected, as said anode portion, to said first conductor of said base member via an anode electrode having an insulator in a portion surrounding said anode electrode; an dielectric made of an oxide film of the parent metal formed on a surface of the parent metal excluding said anode portion, and a cathode body made up of a conductive polymer layer overlying said dielectric and a cathode conductor layer overlying said conductive polymer layer, and wherein a part of said cathode conductor layer as the cathode portion is connected to said second conductor of said base member.

2. The solid electrolytic capacitor according to claim 1, wherein, on at least one of the upper surface and lower surface of said base member are formed first metal plates or first metal foils and second metal plates or second metal foils, each being connected to each of said first conductors and second conductors wherein each of said metal plates or metal foils is connected to each of said anode portions and said cathode portions.

3. The solid electrolytic capacitor according to claim 1, wherein a thermal expansion coefficient of a composite material making up said electrolytic capacitor in a surface portion on the electrode mounting face side of said base member is in a range between 16 ppm/° C. and 26 ppm/° C.

4. A solid electrolytic capacitor comprising:

a base member having a capacitor element connecting face on its upper surface side and an electrode mounting face on its lower surface side and an insulating plate comprising a plurality of first conductors and a plurality of second conductors each providing conduction between the upper and lower surfaces of said base member each being disposed in a staggered format; and a capacitor element having a plurality of anode portions and a plurality of cathode portions each being disposed, in a staggered format, on the upper surface of said base member being connected to each of said first and second conductors, wherein said capacitor element comprises an anode body made of a parent material which is plate-like or foil-like valve-action metal, a plurality of part of which is connected, as each of the anode portions, to each of said first conductors of said base member via each anode electrode having an insulator in a portion surrounding the anode electrode, dielectrics made of oxide films formed on surfaces of the parent metal excluding each of said anode portions, and a cathode body made up of a conductive polymer layer overlaid on each of said dielectrics and a cathode conductor layer formed on said conductive polymer layer, and wherein a plurality of parts of said cathode conductor layer as each of the cathode portion is connected to each of said second conductor of said base member.

5. The solid electrolytic capacitor according to claim 4, wherein, on at least one of the upper surface and lower surface of said base member are formed first metal plates or first metal foils and second metal plates or second metal foils each being connected to each of said first conductors and second conductors wherein each of said metal plates or metal foils is connected to each of said anode portions and said cathode portions.

6. The solid electrolytic capacitor according to claim 5, wherein a thermal expansion coefficient of a composite material making up said electrolytic capacitor in a surface portion on the electrode mounting face side of said base member is in a range between 16 ppm/° C. and 26 ppm/° C.

* * * * *